United States Patent [19]

Johnson et al.

[11] Patent Number: 4,571,112
[45] Date of Patent: Feb. 18, 1986

[54] JOINT ASSEMBLY

[76] Inventors: Louis W. Johnson; Bruce G. Johnson, both of 2435 Prairie Rd., Eugene, Oreg. 97402

[21] Appl. No.: 590,174

[22] Filed: Mar. 16, 1984

Related U.S. Application Data

[63] Continuation-in-part of Ser. No. 259,996, May 4, 1981, abandoned.

[51] Int. Cl.[4] .................. F16G 11/00; F16L 15/00
[52] U.S. Cl. .................. 403/320; 403/343; 403/261; 241/207; 241/215; 241/285 R; 173/131; 384/283; 285/94
[58] Field of Search .............. 403/343, 360, 261, 326; 241/207–216, 285 R; 173/131, 126, 127; 384/315, 282, 283, 284; 285/94, 333, 334, 355, 390; 411/304, 302, 324, 428, 907, 908, 436, 411

[56] References Cited

U.S. PATENT DOCUMENTS

| 2,341,670 | 2/1944 | Stinson | 285/355 X |
| 3,002,770 | 10/1961 | Chesnut et al. | 285/94 |
| 3,081,644 | 3/1963 | Hudgens et al. | 285/94 X |
| 3,167,366 | 1/1965 | Freund | 384/283 |
| 3,582,008 | 6/1971 | Motz | 241/207 X |
| 4,192,472 | 3/1980 | Johnson | 241/215 |
| 4,351,490 | 9/1982 | Johnson | 241/207 |
| 4,454,994 | 6/1984 | Johnson et al. | 241/216 X |

FOREIGN PATENT DOCUMENTS 757487 1/1953 United Kingdom.

Primary Examiner—Cornelius J. Husar
Assistant Examiner—Todd G. Williams
Attorney, Agent, or Firm—Eugene M. Eckelman

[57] ABSTRACT

Oppositely facing surfaces have grooves in one of the surfaces and low coefficient of friction inserts in the grooves. The inserts have a thickness greater than the depth of the grooves so as to project from the grooves when seated therein for bearing against a facing surface and maintaining the two surfaces in spaced apart relation. Such inserts provide a reduced friction relation between the two surfaces whereby the two surfaces can be readily rotated between a working condition having a thrust load therebetween and a loosened non-working condition. Preferably, two or more of the grooves and inserts are provided, the inserts being held in the grooves by distorted portions in the walls of the grooves. The joint assembly of the invention is particularly applicable to rock crushers of the type having a threaded connecting joint between a bowl member and support therefor, whereby the low coefficient of friction inserts provide a liner or spacer which prevents galling of the threads under heavy load and provides for ready rotation of the two members when desired. The present joint assembly may also be used in association with the threads of a jam nut of a type which locks the bowl against rotation on the support, and furthermore may be used in unthreaded opposing surfaces between the jam nut and the support.

9 Claims, 4 Drawing Figures

JOINT ASSEMBLY

REFERENCE TO PRIOR APPLICATIONS

This application is a continuation-in-part of application Ser. No. 259,996, filed May 4, 1981, now abandoned.

BACKGROUND OF THE INVENTION

This invention relates to new and useful improvements in joint assemblies and particularly pertains to a joint assembly for use between a pair of members of the type that are arranged to bear a thrust load therebetween in a tightened working condition but are arranged to be loosened from each other toward a non-working condition.

Various types of joint structures, such as threaded joints, require movement of the parts between a tightened working condition and a loosened non-working condition. In those structures where a substantially heavy thrust load occurs between parts of the joint, metal surfaces may have a galling effect whereby it is extremely difficult to loosen one part from the other. Various lubricating means have been provided between the facing surfaces of these joints, such as flat plastic liners, and although such liners are effective in providing the desired lubricating qualities, they sometimes flow out of the joint under heavy pressure and also are difficult to renew, particularly in the field.

SUMMARY OF THE INVENTION

According to the present invention and forming a primary objective thereof, a novel joint assembly is provided employing means which allow the joint assembly to bear a substantially heavy thrust load but which at the same time allow the members of the joint to be readily loosened from each other toward a non-working condition.

Another object of the invention is to provide a joint assembly of the type described employing insert means having a structure facilitating easy and inexpensive installation as well as easy and inexpensive renewal.

It is also an object of the invention to provide a novel means for holding such insert means in their installed position.

In carrying out the invention, one surface of oppositely facing members of a joint is provided with one or more grooves arranged to receive inserts having a low coefficient of friction. The inserts are of a thickness greater than the depth of the grooves so as to project therefrom and bear against the opposite member for maintaining the facing surfaces of the members in spaced apart relation in a working condition and to provide a reduced friction between the surfaces for moving them between their working condition and a loosened non-working condition. The grooves are provided in close spaced parallel relation and the inserts are held in place by suitable means such as a punched distortion of wall portions between the grooves.

The invention will be better understood and additional objects and advantages will become apparent from the following description taken in connection with the accompanying drawings.

DETAILED DESCRIPTION OF A PREFERRED EMBODIMENT

The present invention has application in most types of joints wherein two members are arranged to be tightened together and wherein it is desirable at times, such as for adjustment, maintenance, or renewal to loosen the members from each other. The joint assembly of the invention has particular adaptation in threaded joints, although it may be adaptable to unthreaded joints as well.

Figure 1:
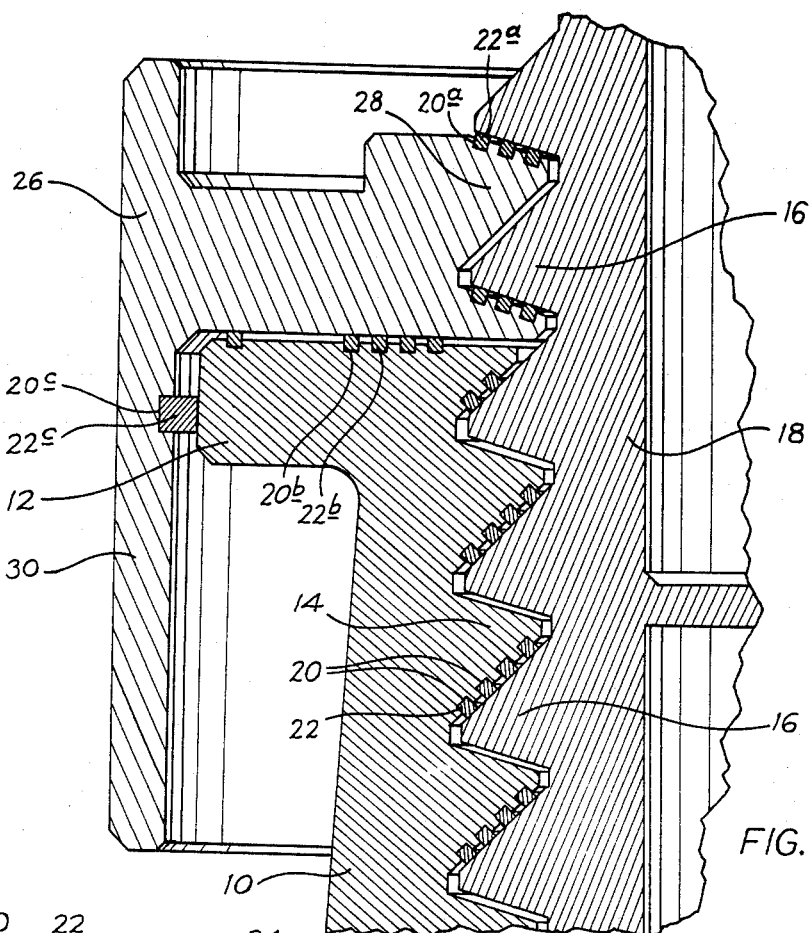
FIG. 1 is a fragmentary sectional view taken through a joint assembly which embodies features of the present invention.
Figure 2:
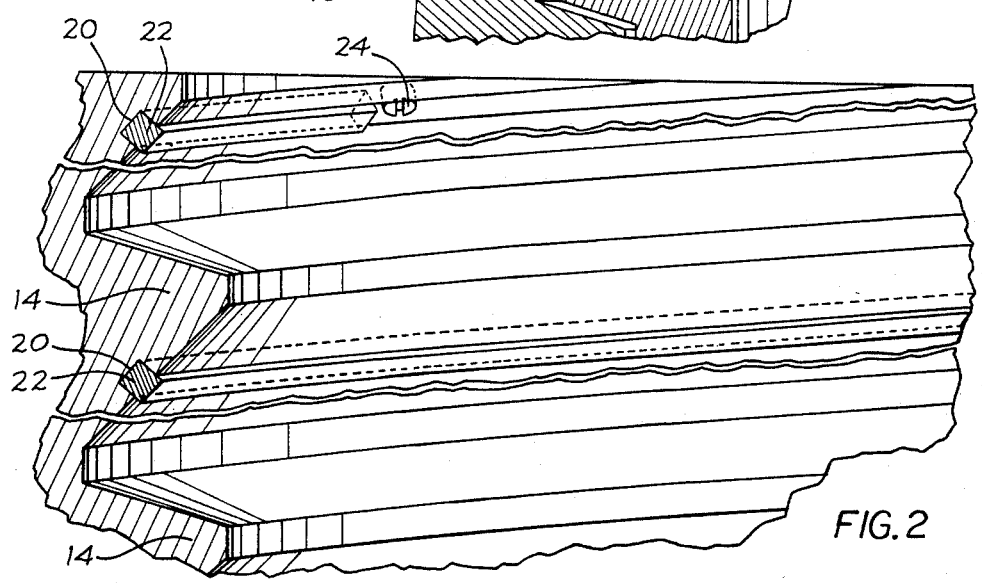
FIG. 2 is a fragmentary foreshortened elevational view of one member of the joint structure of FIG. 1.

The invention is illustrated herein in association with a rock crusher but as stated it may have other uses as well. The numeral 10 in FIG. 1 designates an upright support member of a rock crusher of conventional design. This support member is annular in shape and has an outwardly extending top flanged portion 12 and inwardly facing threads 14. Threads 14 have meshing engagement with outwardly facing threads 16 of a bowl member 18 of conventional construction and arranged to be operative with other mechanisms, not shown, for crushing rock in the operation of the rock crusher. Support member 10 has suitable anchored connection to a base member or other stationary means and the threads 14 and 16 between it and the bowl bear the crushing forces from the working mechanism of the crusher. The heavy thrust load from the crushing forces are upward on the thread surfaces and such thrust forces in conventional crushers are generally of a magnitude to cause galling of the threads when any sliding occurs between the metal to metal contact while such pressure is present. Heavy grease is not a reliable means to prevent galling or metal transfer. If conventional flat type liners are used, they are frequently forced out of the area between thread surfaces and are difficult to bond. In either case, the metal to metal threads may lock together by galling and it is extremely difficult to rotate the bowl 18 relative to the support member 10 for adjustment, maintenance or removal.

According to the invention, the diameter of the bowl threads 16 is less than the diameter of the support member threads 14 to provide a space therebetween and one of the opposing surfaces of threads 14 and 16 is provided with one or more grooves 20 which receive inserts 22 of a low coefficient friction material such as nylon, brass, plastic, Delrin or other appropriate material which has a high compression strength and at the same time is sufficiently flexible to allow the inserts to be threaded into the grooves. Preferably, the grooves 20 are provided in the female facing surfaces of the threads 14 of the support member 10.

The thickness of the inserts 22 is greater than the depth of the grooves so that such inserts extend through the space between the threads and engage the surface of the threads 16 of the bowl member 18. The inserts thus hold the two threaded surfaces in spaced relation and there will be no metal to metal contact. The remaining portion of the threads, namely, the upwardly facing surfaces of threads 14 and the downwardly facing surfaces of threads 16 will also be held in spaced relation to prevent metal to metal contact. The inserts 22 form a lining for the threads in those areas which are subjected to the heavy upward thrust load and in view of their thick body construction they will bear a heavy load without collapsing under pressure.

The grooves 20 are cut along the face surface of the threads, starting at the upper terminal end of the threads and continuing to the bottom of the joint. The terminal ends of the grooves 20 are closed by stops 24 for abutment thereagainst of the ends of the inserts. Such inserts may be provided in segmental lengths and extend in end abutment from one stop 24 to the other. In a preferred structure the grooves have a right angular wall relationship and the inserts are rectangular in cross section, thus providing a good bearing surface against the opposite member as well as providing a stable seated engagement in their base member.

In a crusher structure of the type described, it is desired that a jam nut 26 with inwardly facing threads 28 have threaded engagement with the threads 16 of the bowl member 18 and be arranged to be threaded down into engagement with the flanged top 12 of the support member 10 so that upon tightening of this jam nut against the support member 10 and the bowl member 18 will be securely locked against rotation on the support member 10. By tightening the jam nut into place, it will provide a locking thrust between the threads 14 and 16 and also between the threads 16 and 28. The locking thrust between the threads 16 and 28 will be in an upward direction and the upwardly facing surfaces of the threads 28 are provided with grooves 20a and inserts 22a similar in structure and mounting and functional arrangement as described in connection with grooves 20 and their inserts 22. The inserts 22a thus eliminate galling between the threads of the jam nut 26 and the bowl member so that the jam nut is readily released when desired.

Similarly, grooves 20b may be provided in the top surface of the flanged portion 12 of the support member 10 for receiving low coefficient of friction inserts 22b for maintaining the bottom surface of the jam nut 26 and the top surface of the support member 10 out of metal to metal contact. Further yet, a depending portion or annular flange 30 of jam nut 26 that is adjacent to the outer edge of the flange 12 is of larger diameter than the flange and has a groove 20c and insert 22c of low coefficient of friction material so that there will be spaced lubricating surfaces between these two parts in the event of any thrust forces acting thereon.

Figure 3:
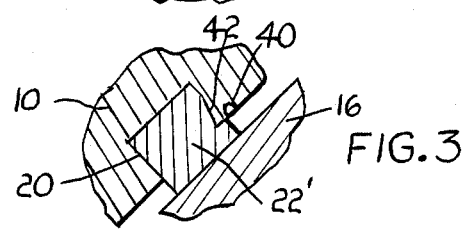
FIG. 3 is an enlarged fragmentary sectional view showing a structural detail associated with the insert means for holding them in place.
Figure 4:
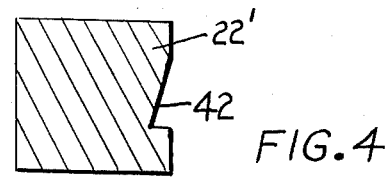
FIG. 4 is an enlarged sectional view of the insert of FIG. 3.

With reference to FIG. 3, it may be desirable to provide a slight distortion 40 of the walls that define the grooves which receive the inserts 22, 22a, 22b or 22c, particularly the inserts 22, since the forces of vibration can possibly shake the inserts from the grooves when the threads are disengaged. These distortions are made at random spacing along the length of the grooves and are produced by a hand or powered punch. These distortions force metal against the side of the inserts to impart a clamping or squeezing engagement. They may be provided on one or both sides of the grooves. Also, the inserts, designated by the reference numeral 22' in FIGS. 3 and 4, may have longitudinal recesses 42 in one or both side walls which receive the distorted portions of the walls of the groove to provide a more secure locking engagement. The recesses 42 are cut such that their outer defining wall portion is disposed at or slightly inwardly of the wall surfaces in which the grooves 20 are cut so as to effectively receive the metal forced laterally by the punch. For replacement, the old inserts can be pulled out of their grooves and new ones forced into the grooves in their place.

The present invention thus provides an insert that will withstand heavy thrust loads without collapsing the joint or flowing out. The inserts will this prevent the opposing surfaces from engaging each other and thus eliminate any galling effect. The inserts are easily installed both in the initial installation and for renewal and by their structure are readily installed in the field.

It is to be understood that the form of our invention herein shown and described is to be taken as a preferred example of the same and that various changes in the shape, size and arrangement of parts may be resorted to without departing from the spirit of my invention, or the scope of the subjoined claims.

Having thus described our invention, we claim:

1. A joint assembly for a pair of members bearing a thrust load therebetween in a tightened working condition but arranged to be loosened from each other toward a non-working condition, said joint assembly comprising
   (a) oppositely facing thread surfaces on respective ones of said members having different dimension for providing a space therebetween,
   (b) first groove means in one of said surfaces having right angular defining walls,
   (c) and insert means having a low coefficient of friction mounted in said first groove means,
   (d) said insert means being rectangular in cross section and of a thickness greater than the depth of said first groove means for projecting from said first groove means when seated therein to project into said space and bear against a facing surface of the other member and maintain the two facing surfaces in spaced apart relation in a thrust working condition and to provide a reduced friction relation between the surfaces for allowing them to be readily moved between a working condition and a loosened non-working condition.

2. The joint assembly of claim 1 including a plurality of said first groove means in said one surface and said insert means extending along said surface in parallel relation.

3. The joint assembly of claim 1 wherein one of said pair of members comprises a stationary support member and said other member comprises a threadedly movable member, said support member including an end surface, and a jam nut having threads engageable with the threads of said movable member and arranged to bear forcibly against the end surface of said support member in a threaded tightened engagement with said support member for locking said movable member against rotation relative to said support member, said jam nut having thread surfaces of different dimension than thread surfaces of said movable member to provide a space therebetween, second groove means in one of said surfaces of said movable member or jam nut, and insert means having a low coefficient of friction mounted in the second groove means of said movable member or jam nut and having a thickness greater than the depth of said second groove means so as to project from second groove means into said space when seated therein to bear against the facing surfaces and maintain said facing surfaces in spaced apart relation when said jam nut forcibly engages said support member and to provide a reduced friction relation between the surfaces of said support member and jam nut for rotating said jam nut to a loosened condition on said support member.

4. The joint assembly of claim 3 also including said second groove means and projecting low coefficient friction insert means in opposing surfaces of said jam nut and said support member.

5. The joint assembly of claim 4 including an outwardly turned flange on said support member having an outer edge, said jam nut having annular flange projecting past said outer edge, third groove means in one of said outer edge and said angular flange, and insert means having a low coefficient of friction mounted in said third groove means and having a thickness greater than the depth of said third groove means so as to project from said third groove means and be engageable with the other of said outer edge and annular flange to provide a reduced friction relation between said jam nut and said flange.

6. The joint assembly of claim 1 wherein one of said members comprises a stationary support member and the other of said members comprises a threadedly movable member, said first groove means being provided in said support member.

7. The joint assembly of claim 1 wherein said first groove means have opposite terminal ends, and abutment means in said first groove means adjacent the terminal ends thereof, said insert means being confined endwise between said abutment means.

8. The joint assembly of claim 1 wherein said members comprise a stationary rock crusher base member and the other of said members comprises a threadedly movable rock crushing bowl.

9. The joint assembly of claim 1 including a plurality of said first groove means and said insert means therein, said first groove means extending along said surface in parallel relation separated by intermediate walls, and distorted portions in said walls projecting into said first groove means to hold said insert means in said first groove means.

* * * * *